United States Patent
Fridman

[11] Patent Number: 5,915,891
[45] Date of Patent: Jun. 29, 1999

[54] DRILL GUIDE AND METHOD FOR INSTALLING A DOOR LOCK

[76] Inventor: Yevgeny Z. Fridman, 4235 Ranwick Ct., San Jose, Calif. 95118

[21] Appl. No.: 09/024,831

[22] Filed: Feb. 17, 1998

[51] Int. Cl.[6] ............................. B23B 35/00; B23B 49/02
[52] U.S. Cl. .............................. 408/1 R; 408/3; 408/16; 408/79; 408/72 B
[58] Field of Search .................................. 408/1 R, 16, 3, 408/79, 72 B, 97, 103, 115 R, 115 B, 241 B, 716

[56] References Cited

U.S. PATENT DOCUMENTS

| | | | |
|---|---|---|---|
| 1,782,284 | 11/1930 | Betancourt | 408/16 |
| 2,466,023 | 4/1949 | Griffin | 408/79 |
| 2,844,977 | 7/1958 | Morse | 408/115 R |
| 3,859,002 | 1/1975 | Sauey | 408/16 |
| 5,116,170 | 5/1992 | Palmer et al. | 408/72 B |
| 5,479,802 | 1/1996 | Miller | 70/443 |
| 5,672,034 | 9/1997 | McLean | 408/79 |
| 5,713,225 | 2/1998 | Smith | 408/97 |
| 5,800,099 | 9/1998 | Cooper | 408/97 |

FOREIGN PATENT DOCUMENTS

| | | | |
|---|---|---|---|
| 4128472 | 10/1993 | Germany | 408/115 R |
| 1780938 | 12/1992 | U.S.S.R. | 408/115 R |

*Primary Examiner*—Daniel W. Howell
*Attorney, Agent, or Firm*—Robert Samuel Smith

[57] ABSTRACT

A drill jig for installing a lockset in a hanging door with an aperture for the lockset. The drill jig has a plate with a plug on one side dimensioned to fit into the aperture. An array of drill bushings is mounted in the plate aligned with a level on the top edge of the plate. Rubber feet protect the the door from being marred by the plate. The plate is positioned against the door in preparation for drilling holes through the drill bushing into the door.

8 Claims, 1 Drawing Sheet

1. Provide drill jig
2. Position drill jig
3. Orient drill jig
4. Drill holes
5. Insert lockset

DRILL GUIDE AND METHOD FOR INSTALLING A DOOR LOCK

FIELD OF THE INVENTION

This invention relates to a drill guide for use in installing a lock into a door and particularly to a drill guide that uses a level to align the drill guides used to secure the lock in the door.

PRIOR ART AND INFORMATION DISCLOSURE

Common procedure for a builder to install a door is to order a door panel that has a standard size aperture (hole through the door) for receiving the lockset. The aperture is typically located near one long edge of the door 36 inches from the bottom edge. The aperture typically has a two inch diameter selected to receive the common lock set. Installation of the drill set requires that a pattern of holes be drilled by the carpenter in the door proximal to the two inch hole through which bolts are inserted to secure the lock set. The position and size of the smaller holes varies according to the lockset selected by the builder.

Alignment of the holes with the edge of the door is very critical fr the sake of appearance as well as for ease of installation of the lockset. Consequently, some rather elaborate drill jigs have been disclosed that are available along with the lockset as aides in installing the doors. Such aids are particularly useful when large numbers of doors are being installed such as when erecting large tracts of residences.

The drill jigs of the prior art are typically plates holding an array of drill bushings. In a common jig, a shoulder is positioned along one edge of the plate. The plate is positioned on the door to be drilled with the shoulder abutting an edge of the door. In this manner, the holes to be drilled are aligned with the edge of the door. This arrangement is only satisfactory when all of the doors have their apertures located at the same distance from the edge of the door.

In another arrangement, the jig is a channel that straddles the edge of the door with one leg (plate) of the channel on each side of the door. Each plate has an array of drill bushings, each bushing aligned with a bushing in the other plate. This arrangement is satisfactory only when all of the doors have the same thickness.

For example, U.S. Pat. No. 5,116,170 to Palmer et al discloses a drill jig for installing a lockset with a flange for attaching a C-clamp.

U.S. Pat. No. 5,479,802 to Miller discloses a method of installing a combination lock deadbolt assembly with a dial lock.

U.S. Pat. No. 5,672,034 discloses a carpenter's locator for use with a door boring jig.

SUMMARY

In view of the problems posed by a requirement to install locksets in doors wherein each door may have any one of a range of thicknesses and aperture locations, it is desirable to provide a drill jig for drilling an array of holes in a hanging door wherein the array of holes can be in various locations and the thickness can be in a range of thicknesses.

This invention is directed toward a plate having mounted on one side a locating disk that fits snugly into the aperture of a door when the plate is laid against the surface of the door. An array of drill bushings is mounted in the plate at required locations relative to the aperture. At least three rubber (bumper) feet are mounted on the side of the disk having the guide disk which protect the door against scratching by the drill jig. A level is mounted on one edge of the plate in view of the carpenter installing the lockset so that when the carpenter inserts the disk into the aperture in the door, he may adjust the orientation of the plate so that the bubble in the level indicates that the level and the edge on which the level is supported is horizontal. When the level is horizontal, the array of drill bushings in the plate is square with the horizontal plane.

DESCRIPTION OF AN ILLUSTRATIVE MODE

Figures 1, 2:
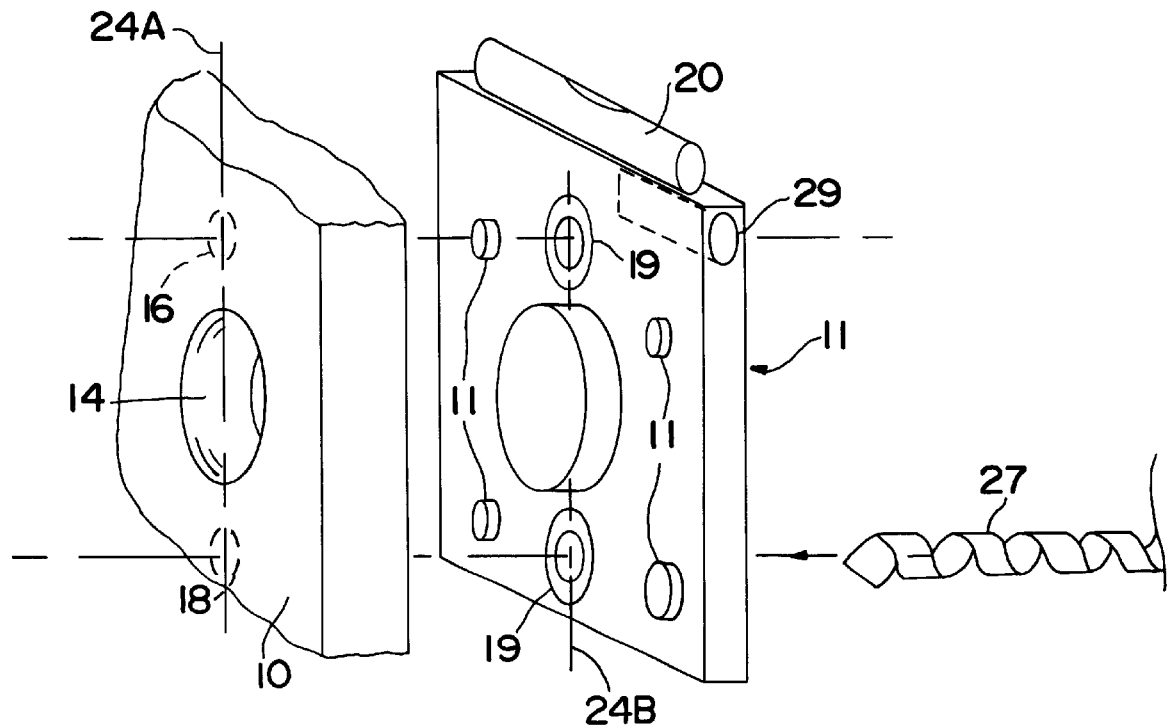
FIG. 1 shows a door panel hung and prepared for installing a lockset.
FIG. 2 shows steps for installing a lockset according to the invention.

Turning now to a discussion of the drawings, FIG. 1 shows a door panel 10 (partially cutaway) hung in a doorway in preparation for installing the lockset The lockset is not shown in FIG. 1. The door panel 10 has been received with a two inch aperture 14 located at a distance from the edge of the door panel 10 that depends on the lockset to be installed.

In order to install the lockset, it is necessary to drill two holes at locations 16, 18, (in phantom) into the door. It is desirable that the centerline 24A through the holes be vertical and necessary that the two hole locations 16, 18 be accurately positioned with respect to the aperture 14.

The drill jig 11 of this invention is also shown in FIG. 1 and includes a rectangular plate 13 with a circular plug 21 on one surface dimensioned to fit into aperture 14. There is also shown a bubble level 20 on the top edge of the plate 13. An array of drill bushings 19 (two are shown in FIG. 1) are mounted in the plate 13 and having a reference line 24B positioned with respect to the level 20 to be vertical when the level 20 is horizontal, Rubber feet 17 on the plate 10 protect the door surface from marring when the surface of the drill jig 11 is against the door in preparation for drilling with drill 27.

Steps in the method for performing the installation are listed in FIG. 2.

The first step is to provide a drill jig 11 of this invention shown in FIG. 1 comprising a (preferably) square plate 13 having a round plug 21 on one side. The side also has at least three rubber feet 17 so that the plate 13 will not mar the door panel 10 when the plug 21 is inserted into the aperture 14. Drill bushings 19 corresponding to holes 16 18 to be drilled into the door panel 10 are also shown. A bubble level 20 is positioned along a "top" edge of the plate 13 in view of the carpenter installing the lockset.

In the second step, the drill jig is positioned against the door panel 10 with the round plug 21 inserted into the aperture 14 and the rubber feet 17 against the door surface.

In step 3, the jig is oriented so that bubble level 20 indicates that the edge 22 is horizontal and, therefore, the centerline 24 of the drill bushings 19 are vertical.

In step 4, the holes 16, 18 are drilled in the door panel 10 through the drill bushings 19.

In step 5, the jig 11 is removed and the lockset is placed in the door panel 10, and bolted in position through the drilled holes.

Variations and modifications may be suggested by reading the specification and studying the drawings which are within the scope of the invention. I therefore wish to define the scope of my invention by the appended claims.

For example, the level need not be positioned on the edge of the plate but may be mounted on the surface of plate.

The plate may have a bracket or hole 29 as shown in FIG. 1 where the particular drill bit for drilling through the bushings may be stored so that the drill bit is readily available when it is needed.

The drill jig may be a hardened steel plate with an array of guide apertures formed in said plate or the drill jig may be a plate of aluminum alloy steel alloy or plastic alloy with hardened steel bushings pressed into said plate.

The plate of the jig with hardened bushings may be made of any material including alloys of aluminum, steel or brass or plastic.

I therefore wish to define the scope of my invention by the appended claims.

What is claimed is:

1. A drill jig for installing a doorset into a door panel having an aperture dimensioned to receive said door set, which comprises:

a plate;

a plug means mounted on one side of said plate for positioning said plate against a surface of said door with said plug means dimensioned to fit snugly inside said aperture;

an array of drill guide holes in said plate in a pattern selected to correspond to an array of holes to be drilled in said door through each one of said array of drill guide holes;

a bubble level means mounted on said plate for guiding a user to orient said plate with said plug in said aperture;

said level oriented with respect to said array to provide that, when said plug is in said aperture and said bubble level is horizontal, a reference line of said array is vertical enabling a user to mount said drill jig on said door with said plug inserted in said aperture, orient said drill jig to where said reference line is vertical and drill holes in said door panel through each said bushing of said array of bushings;

means adapted for storing a drill bit used to drill holes through said door panel.

2. The drill jig of claim 1 wherein said plate has a rectangular shape with a top edge, a bottom edge and two side edges.

3. The drill jig of claim 2 wherein said bubble level is a tube mounted on said top edge with an axis of said tube parallel to said top edge.

4. A method for installing a lockset in a hanging door having an aperture dimensioned for receiving said lockset which includes the steps in operable order:

(a) providing a drill jig including:

(i) a plate;

(ii) a plug means mounted on one side of said plate for positioning said plate against a surface of said door with said plug means dimensioned to fit snugly inside said aperture;

(iii) an array of drill guide holes in said plate in a pattern selected to correspond to an array of holes to be drilled in said door through each one of said array of drill guide holes;

(iv) a bubble level means mounted on said plate for guiding a user to orient said plate with said plug in said aperture;

(v) said level oriented with respect to said array to provide that, when said plug is in said aperture and said bubble level is horizontal, a reference line of said array is vertical enabling a user to mount said drill jig on said door with said plug inserted in said aperture, orient said drill jig to where said reference line is vertical and drill holes in said door panel through each said bushing of said array of bushings;

(vi) at least three rubber feet means positioned on said one surface for protecting said surface of said door from marring by said drill jig;

(b) positioning said plate against said door with said plug positioned in said aperture of said door;

(c) orienting said plate to where said bubble level is horizontal;

(d) drilling holes in said door through said each drill guide hole;

(e) removing said drill jig and mounting said lockset in said door and bolting said lockset with a bolt in each hole of said array of holes.

5. The drill jig of claim 1 wherein said drill guide holes formed in said plate comprises hardened drill bushings pressed into holes in said plate.

6. The drill jig of claim 5 wherein said plate is made of a material selected from a group of materials that consists of aluminum alloy, steel alloy and plastic.

7. The drill jig of claim 5 wherein said plate is a hardened steel plate.

8. A drill jig for installing a doorset into a door panel having an aperture dimensioned to receive said door set, which comprises:

a plate;

a plug means mounted on one side of said plate for positioning said plate against a surface of said door with said plug means dimensioned to fit snugly inside said aperture;

an array of drill guide holes in said plate in a pattern selected to correspond to an array of holes to be drilled in said door through each one of said array of drill guide holes;

a bubble level means mounted on said plate for guiding a user to orient said plate with said plug in said aperture;

said level oriented with respect to said array to provide that, when said plug is in said aperture and said bubble level is horizontal, a reference line of said array is vertical enabling a user to mount said drill jig on said door with said plug inserted in said aperture, orient said drill jig to where said reference line is vertical and drill holes in said door panel through each said bushing of said array of bushings;

at least three rubber feet means positioned on said one surface for protecting said surface of said door from marring by said drill jig.

\* \* \* \* \*